United States Patent [19]
Yamazaki et al.

[11] 4,452,888
[45] Jun. 5, 1984

[54] PROCESS FOR PRODUCING A LOW-MOLECULAR WEIGHT PEPTIDE COMPOSITION AND NUTRIENT AGENT CONTAINING THE SAME

[75] Inventors: Ken-ichi Yamazaki, Kawagoe; Shoji Takao, Higashikurume; Hiroshi Hara, Fuchu, all of Japan

[73] Assignee: Terumo Corporation, Tokyo, Japan

[21] Appl. No.: 279,254

[22] Filed: Jul. 1, 1981

[30] Foreign Application Priority Data

Jul. 10, 1980 [JP] Japan ................................. 55-94168
Jul. 10, 1980 [JP] Japan ................................. 55-94169

[51] Int. Cl.$^3$ ..................... C12P 21/06; A23J 1/00; A23L 1/20; A23L 1/31
[52] U.S. Cl. .......................................... 435/69; 426/7; 426/32; 426/42; 426/44; 426/46; 426/52; 426/56; 426/656; 260/112 R
[58] Field of Search ................... 435/71, 68, 69, 70; 426/32, 42, 44, 46, 52, 56, 7, 656; 260/112 R

[56] References Cited

U.S. PATENT DOCUMENTS 2,364,008 11/1944 Stuart ..................................... 426/32
2,473,255 6/1949 Parfentjev ............................. 426/42
4,138,500 2/1979 Fulger et al. ......................... 426/44
4,282,319 8/1981 Conrad ................................... 435/69

OTHER PUBLICATIONS

T. Nakadai et al., J. Ferment. Technol., vol. 54, No. 12, (1976), pp. 872–884.
Proc. IV Int. Cong. Food Sci. & Technol. (1974), vol. V, pp. 96–102.
Br. J. Nutrition, vol. 33, No. 1, (Jan. 1975), pp. 95–100.

*Primary Examiner*—Raymond N. Jones
*Assistant Examiner*—Elizabeth J. Curtin
*Attorney, Agent, or Firm*—Frishauf, Holtz, Goodman & Woodward

[57] ABSTRACT

A low-molecular weight peptide composition mainly based on dipeptides and tripeptides is produced by dispersing protein raw material from any suitable source in water at a concentration of 5 to 20 w/v %, adjusting the pH of the dispersion to 1 to 4 with an acid, adding at least two acid proteases to the dispersion, and permitting enzymatic proteolysis to take place for a desired period of time at a suitable temperature while supressing the formation of free amino acids. Also provided is a nutrient agent comprising the thus produced low-molecular weight peptide composition mainly based on dipeptides and tripeptides wherein the contents of free amino acids and those peptides having a molecular weight of at least 700 are individually 20% by weight or less. The nutrient agent is useful in medical treatment.

11 Claims, No Drawings

PROCESS FOR PRODUCING A LOW-MOLECULAR WEIGHT PEPTIDE COMPOSITION AND NUTRIENT AGENT CONTAINING THE SAME

BACKGROUND OF THE INVENTION

This invention relates to a process for producing a protein or low-molecular weight peptide composition mainly based on dipeptides and tripeptides, and an oral or enteral nutrient agent comprising the thus produced low-molecular peptide composition.

Heretofore, particularly in the food industry, peptides and amino acids have been produced through enzymatic hydrolysis of protein material. However, such attempts have been limited to the enzymatic hydrolysis of protein material for solubilization thereof and the conversion of protein material to lower polymers (with a molecular weight of higher than several thousand) serviceable in a nutritional form. Attention has been paid to the attribute of proteolytic products, but not to their molecular weight as such.

Making researches on the digestion and absorption of the enzymatic hydrolysis product of protein material, the inventors have found that by (1) reducing the average molecular weight to 1,500 or lower, preferably 700 or lower, (2) reducing the content of those peptides having a molecular weight of 2,000 or higher, preferably 1,000 or higher to 20% by weight or less, and (3) reducing the content of free amino acids to 20% by weight or less, that is, by producing a low-molecular weight peptide composition mainly based on dipeptides and tripeptides, a number of advantages are obtained as described below.

(1) This low-molecular weight peptide composition is different in enteral absorption from protein materials or amino acid mixtures containing the same amino acid constituents. Total nitrogen absorption rate is increased and the absorption antagonism between amino acids is minimized.

(2) It is an efficient nitrogen source because of improved nitrogen balance.

(3) Weight gain is remarkably increased.

(4) Cholesterol value in blood is reduced.

Conventional peptized products have either a low degree of proteolysis or an extremely high content of free amino acids. Differently stated, because of varying degrees of proteolysis, they contain from those peptides having a molecular weight of several ten thousand to free amino acids. Some products have an average molecular weight of higher than several thousand and some contain more than 50% of free amino acids.

The inventors have found that when used as a nutrient agent, a peptide composition which is limited within a narrow range of molecular weight is more effective and efficient in digestion and absorption or in physiological alimentation than conventional products such as solubilized protein materials, peptide mixtures having a wide distribution of molecular weight, or amino acid mixtures. The low-molecular weight peptide composition to be included in a nutrient agent according to the present invention is mainly based on dipeptides and tripeptides and contains 20% by weight or less of peptides having a molecular weight of 700 or higher and 20% by weight or less of free amino acids, said composition being produced by controlling the molecular weight of protein raw material as specified above.

Recently, it is believed that dipeptides and tripeptides are readily absorbed enterally. The inventors have for the first time confirmed this fact by in vivo experiments for a mixture of these peptides as described in detail hereinafter.

The inventors have also found that although free amino acid mixtures tend to be unevenly absorbed due to antagonism or reduced solubility, low-molecular weight peptides are free of such uneven absorption. Accordingly, such low-molecular weight peptide compositions as described above are preferred as a protein source for a nutrient agent.

As no importance has been attached to the low-molecular weight peptides which have apparent utility as mentioned above, any effective process for the production thereof has not been developed. It is therefore, a primary object of the present invention to provide a process for producing a low-molecular weight peptide composition mainly based on dipeptides and tripeptides, that is, having an average molecular weight of about 400 and a free amino acid content of 20% by weight or less.

Another object of the present invention is to provide a process for producing a low-molecular peptide composition as specified above from a protein raw material from any suitable source in high yields.

A further object of the present invention is to provide a process for producing a low-molecular peptide composition in which amino acid absorption antagonism is minimized and the content of free amino acids is reduced.

It is a secondary object of the present invention to provide a nutrient agent comprising a low-molecular weight peptide composition mainly based on dipeptides and tripeptides which is an efficient nitrogen source at it has reduced amino acid absorption antagonism, increased solubility, increased total nitrogen absorption rate, and improved nitrogen balance.

It is a further object of the present invention to provide a low-molecular peptide containing nutrient agent which serves as an efficient nitrogen source capable of providing an positive weight gain and a reduced cholesterol value in blood.

It is a still further object of the present invention to provide a nutrient agent in which protein material is hydrolyzed into well-absorbable low-molecular peptides, typically dipeptides and tripeptides so that it can be administered not only as an oral nutrient agent capable of easy alimentation, but also as an enteral nutrient agent directly into the stomach of a weak patient.

SUMMARY OF THE INVENTION

According to a first aspect of the present invention, there is provided a process for producing a low-molecular weight peptide composition, characterized by the steps of dispersing protein raw material from any suitable source in water at a concentration of 5-20 w/v%, adjusting the pH of the dispersion to 1-4 with an acid, adding at least two acid proteases to the dispersion simultaneously or sequentially, and permitting enzymatic proteolysis to take place for 8-72 hours at a temperature of 25°-60° C., thereby producing a low-molecular weight peptide composition mainly based on dipeptides and tripeptides while suppressing the formation of free amino acids.

Also, the present invention provides a process for producing a low-molecular peptide composition such that the contents of free amino acids and those peptides having a molecular weight of at least 700 in the enzymatic proteolysis product are individually 20% or less.

According to a second aspect of the present invention, there is provided a nutrient agent comprising a low-molecular peptide composition mainly based on dipeptides and tripeptides, wherein said composition is produced by the proteolysis of protein raw material while suppressing the formation of free amino acids.

In a preferred embodiment of the present invention, the contents of free amino acids and those peptides having a molecular weight of at least 700 are individually 20% by weight or less in the enzymatic proteolysis product. The low-molecular peptide composition of the nutrient agent may further contain one or more necessary amino acids, if desired.

DESCRIPTION OF THE PREFERRED EMBODIMENTS

In the prior art, no discussion has been made on low-molecular peptides composed mainly of dipeptides and tripeptides which have many advantages as concluded from the test results shown in Tables I to IV. Making an attempt to produce such low-molecular peptides from a protein raw material from any suitable source, the inventors have found the following facts (see Table V).

(1) Although pepsin has the highest solubilizing power among proteases, it is very difficult to reduce the average molecular weight to 1,000 or lower with pepsin as the hydrolysis of protein material with pepsin does not proceed with ease after a given molecular weight is reached.

(2) Neutral proteases have reduced proteolytic activity as compared with acid proteases and only pronase can reduce the average molecular weight of a proteolytic product to 1,000 or lower. However, since the pronase consists of composite proteases, free amino acids are produced to such a large extent that the free amino acids occupy more than about 50% when the average molecular weight is reduced to about 500.

(3) Acid proteases have the best proteolytic activity and among them, Molsin (manufactured and sold by Fujisawa Chemicals K.K.), Sanprose-F (manufactured and sold by Hankyu Kyoei Bussan K.K.) and the like are particularly effective with the minimum formation of free amino acids.

Molsin is an acid resistant protein digesting enzymatic preparation which contains the protease Aspergillopeptidase A obtained by culturing *Aspergillus Saitoi* in a suitable culture medium and then extracting, precipitating and drying the resulting cultured product into a powder. Molsin is a pale grey white powder which is substantially soluble in water and almost insoluble in alcohol. The optimum pH of Molsin is in the range of 2.5–3.0.

Sanprose-F is an acid protease preparation, secreted by a strain of Rhizopus, which also contains amylose and cellulose. The optimum pH of Sanprose-F is 3.0 and the preparation is stable at a pH range of 3.0–6.0. Sanprose-F substantially decomposes hemoglobin and albumen and only slightly decomposes gelatin.

(4) Neither of the now available proteases can succeed in reducing the molecular weight to a desired low level when used alone. The investigation on proteolysis reactions using various combinations of proteases has shown that protease combinations of pepsin-Molsin, pepsin-Sanprose, and Molsin-Sanprose are effective to reduce the molecular weight to a low level as desired and to reduce the content of free amino acids.

The invention will be more fully understood by referring to the following examples which are set forth by way of illustration and not by way of limitation. Various modifications may be made on the examples without departing from the scope and spirit of the invention. For instance, the proteases used herein may be selected from those proteases from fungus and bacterial sources such as Rhizopus, Aspergillus, Penicillium and Bacillus genus proteases. Also effective are papain and bromelain from plant sources. In addition, special proteases, for example, carboxypeptidases and aminopeptidases, more particularly carboxy or amino di- or tri-peptidase may, of course, be selected.

EXAMPLE I 50 g of dry egg white (protein content 82% by weight) was dissolved in 1 liter of water, the resulting solution was adjusted to pH 3 with aqueous hydrochloric acid, 1 g of Molsin and 1 g of Sanprose-F were simultaneously added thereto, and thereafter the reaction was effected at 40° C. for 24 hours while keeping the solution at pH 3. After the reaction, the solution was heated at 100° C. for 10 minutes to deactivate the proteases and then subjected to centrifugal separation at 3,000 r.p.m. (1,500 G) for 10 minutes. The insolubles were removed and the supernatant was freeze dried. This product had a yield of 93.2% based on the starting protein material and an average molecular weight of 340. The gel filtration of the product showed that more than 88% by weight of the product had a molecular weight of lower than 700. It should be noted that those substances having a molecular weight of lower than 700 cannot be identified by the gel filtration process. The content of free amino acids in the product was 8.5% by weight.

EXAMPLE II

The procedure of Example I was repeated except that 1 g of Molsin was first added and after 8 hours, 1 g of Sanprose-F was added, and the reaction was effected for a further 10 hours. The resulting product had an yield of 93.9%, an average molecular weight of 350, and a free amino acid content of 8.1%. The gel filtration thereof showed that more than 90% had a molecular weight of lower than 700.

EXAMPLE III

The procedure of Example I was repeated except that 1 g of pepsin and 1 g of Molsin were simultaneously added. The resulting product had an yield of 96.1%, an average molecular weight of 510, and a free amino acid content of 7.8% by weight. The gel filtration thereof showed that more than 86% had a molecular weight of lower than 700.

EXAMPLE IV

The procedure of Example I was repeated except that 1 g of pepsin was first added and after 6 hours, 1 g of Molsin was added, and the reaction was effected for a further 10 hours. The resulting product had an yield of 98.3%, an average molecular weight of 550, and a free amino acid content of 7.3% by weight. The gel filtration thereof showed that more than 83% had a molecular weight of lower than 700.

EXAMPLE V

The procedure of Example I was repeated except that 1 g of pepsin and 1 g of Sanprose-F were simultaneously added. The resulting product had an yield of 94%, an average molecular weight of 430, and a free amino acid content of 8.7% by weight. The gel filtration thereof showed that more than 90% had a molecular weigh of less than 700.

EXAMPLE VI

The procedure of Example I was repeated except that 1 g of pepsin was first added and after 6 hours, 1 g of Sanprose-F was added, and the reaction was effected for a further 10 hours. The resulting product had an yield of 96%, an average molecular weight of 410, and a free amino acid content of 9.2% by weight. The gel filtration showed that more than 91% had a molecular weight of lower than 700.

EXAMPLE VII

The procedure of Example I was repeated except that 0.25 g of pepsin was first added, after 3 hours 1 g of Molsin was added, and then after further 3 hours 1 g of Sanprose-F was added. The reaction was effected for a further 10 hours, followed by the same treatment as in Example I. The resulting product had an yield of 95%, an average molecular weight of 370, and a free amino acid content of 11.3% by weight. The gel filtration showed that more than 93% had a molecular weight of lower than 700.

In the above examples, the products are evaluated by the following methods.

(1) Yield of a product $$\frac{\text{Amount of nitrogen in product}}{\text{Amount of nitrogen in raw material}} \times 100\%$$

Analysis of nitrogen is made by the Kjeldahl method.

(2) Average molecular weight of a product $$\left(\begin{array}{l}\text{Average molecular weight of}\\ \text{constituent amino acids in}\\ \text{protein raw material}\end{array}\right) \times$$

$$\frac{\left(\begin{array}{l}\text{Molar number of amino group}\\ \text{per gram of product}\end{array}\right)}{\left(\begin{array}{l}\text{Molar number of amino group}\\ \text{in complete hydrolyzate of}\\ \text{1 g of product}\end{array}\right)}$$

The quantitative analysis of amino group is made by the TNBS (Tri-Nitro-Benzene-Sulphonic acid) method. The complete hydrolysis of the product is a hydrolysis in 6N HCl at 110° C. for 24 hours.

(3) Free amino acid content

A solution of the product is treated with basic copper carbonate to form copper complexes with amino acids and peptides, which are adsorbed by an anion exchange resin, through which a 0.05 M boric acid buffer solution is passed to elute the free amino acids, which are in turn, subjected to quantitative analysis by means of an automatic amino acid analyzer. It is to be noted that the quantitative analysis of acidic amino acids was conducted by placing the product directly in the amino acid analyzer because acidic amino acids are not eluted with the boric acid buffer solution. Accurate quantitative analysis can be made as peptides have no influence on acidic amino acids at their separation position in the amino acid analyzer.

(4) Gel filtration

The percentage of peptides having a molecular weight of 700 or lower is determined using Sephadex G-10 having the minimum fractional molecular weight.

Although egg white is used as the protein raw material in the above examples, other protein raw materials may be used, for instance, casein, soybean, wheat gluten, fish meal, Chlorella, yeast protein, etc. as well as protein-like material having specific amino acids enriched by the plastein reaction. Particularly when low-molecular weight peptides are used in nutrient agents, egg white is the best because of its amino acid constitution. The protein raw material is dissolved in water to a substrate concentration of 5-20 w/v%. Lower concentrations are unsuitable for practical operation while higher concentrations result in an extremely viscous solution. Proteases are added in an amount sufficient to give a desired degree of proteolysis, that is, at least 1% by weight, preferably 2-5% by weight based on the substrate. The reaction time depends on substrate concentration, protease amount, reaction temperature and the like. The reaction must be terminated before the resulting peptide composition has been hydrolyzed to amino acids. The reaction temperature depends on the optimum temperature of a particular protease used. The acid used herein may be either a strong acid or a weak acid.

For the purpose of comparison with the proteolysis by the combination of two proteases as used in the examples according to the present process, the results of proteolysis by a single protease are shown in Table V.

TABLE V

| Protease | Source | pH | Yield (%) | Average molecular weight | Free amino acid (%) |
|---|---|---|---|---|---|
| Pepsin | pig | 2.0 | 87.3 | 1550 | 3.7 |
| Tripsin | cow | 6.8 | 16.5 | 820 | 1.9 |
| Papain | papaya | 6.8 | 21.6 | 420 | 2.4 |
| Acid protease | Aspergillus niger | 3.0 | 78.1 | 550 | 9.6 |
| Neutral protease | Bacillus subtilis | 6.8 | 11.2 | 1300 | 8.7 |
| Alkaline protease | Bacillus subtilis | 8.0 | 20.8 | 950 | 8.3 |
| Molsin | Aspergillus saitoi | 2.8 | 67.3 | 620 | 6.2 |
| Sanprose-F | Rhizopus chinensis | 3.0 | 68.1 | 590 | 6.9 |

The comparison of data between the examples and Table V reveals that the present process ensures to produce a low-molecular weight peptide composition from various protein sources in high yields, which composition is mainly based on dipeptides and tripeptides or those peptides having a molecular weight on the order of 500 or lower, the content of free amino acids is 10% by weight or less so that the amino acid absorption antagonism is minimized, and the content of relatively high molecular peptides having a molecular weight of higher than 700 is 20% or less.

The low-molecular peptide composition mainly based on dipeptides and tripeptides and used in the nutrient agent according to the present invention will be described in detail particularly with respect to its effectiveness and preparation.

As no attention has heretofore been paid to those peptides which are rendered low molecular in a limited range as in the present invention, any process for preparing the same has not been developed. The inventors have developed a process for producing a controlled low-molecular weight peptide composition in high yields in a stable manner, as illustrated in the above and following examples.

PRODUCTION EXAMPLE

Protein raw material is dissolved in water at a concentration of 5-20 w/v%. The pH of the solution is adjusted to 1-4 with an acid. Any two proteases selected from pepsin, Molsin and Sanprose-F are simutaneously or sequentially added to the substrate each in an amount of 0.5-5% by weight. The reaction is effected at a temperature of 25°-60° C. for 20-30 hours. After the proteases are deactivated, the reaction solution is subjected to centrifugal separation and the resulting supernatant is dried. The product is obtained in a very high yield on the basis of the protein raw material, has an average molecular weight of about 550-300, and contains about 5-20% by weight of free amino acids and 20% by weight or less of those peptides having a molecular weight of 700 or higher. It should be understood that the protein raw material used herein may include not only protein materials from animal, plant and microbial sources, but also a protein-like material having specific amino acids enriched by the plastein reaction.

The thus produced low-molecular peptide composition is used as a protein or nitrogen source in a nutrient agent according to the present invention. In order to demonstrate the effectiveness of such a nutrient agent, diets containing a nitrogen source composed of the same amino acid constituents were prepared as shown in the following Table I.

TABLE I

| Ingredient | Diet A | B | C | D |
|---|---|---|---|---|
| N-source (wt %) | 23.0 | 23.0 | 23.0 | 23.0 |
| Cellulose (wt %) | 1.0 | 1.0 | 0.4 | 1.0 |
| Corn starch (wt %) | 66.0 | 66.0 | 66.0 | 66.0 |
| Corn oil (wt %) | 5.0 | 5.0 | 5.0 | 5.0 |
| Salt mixture (wt %) | 4.0 | 4.0 | 4.0 | 4.0 |
| Vitamin (wt %) mixture | 1.0 | 1.0 | 1.0 | 1.0 |
| Vitamin A (I.U.) | 3000 | 3000 | 3000 | 3000 |
| Vitamin D (mg) | 7.5 | 7.5 | 7.5 | 7.5 |
| Choline chloride (ml) | 0.4 | 0.4 | 0.4 | 0.4 |
| α-Tocopherol (mg) | 10 | 10 | 10 | 10 |

In Table I, the nitrogen sources have the following compositions.

A ... I egg white protein
B ... II a peptide composition with an average molecular weight of 420 and a free amino acid content of 8% by weight.
C ... III a corresponding mixture of free amino acids.
D ... IV a peptide composition with an average molecular weight of 1,400 and a free amino acid content of 2% by weight.

A group of 10 rats of Wistar strain was allowed to feed on each of these diets for two weeks. The results are shown in Table II.

TABLE II

| | N-Retention (mg/Day) | Food efficiency | Choresterol/serum (mg/dl) |
|---|---|---|---|
| I | 158 | 1.0 | 118 |
| II | 197 | 1.32 | 95 |
| III | 124 | 0.86 | 148 |
| IV | 160 | 1.07 | 116 |

In Table II, the food efficiency represents the ratio of a weight gain/food intake value of each of compositions II, III and IV to that of composition I provided that the latter is unity. The data in Table II proves that the diet containing low-molecular peptide composition II mainly based on dipeptides and tripeptides is highly effective in many respects as described below.

(1) Nitrogen retention in vivo is at least 20% higher than diets I and IV (conventional peptide proteolytic product), and extremely higher than diet III (amino acid mixture).

(2) Since the effective utilization of nitrogen in vivo is high as described in (1), the food efficiency of diet II is at least 20% higher than the remainings. This means that diet II facilitates growth and ensures a substantial weight gain.

(3) The cholesterol value in blood corresponding to diet II is exceptionally low. Diet II is regarded effective to reduce the cholesterol value in blood.

In order to find why these differences are derived, an absorption experiment in vivo was performed using different nitrogen sources.

Illustratively, only a nitrogen source is forcedly tube fed into the stomach of each of five Wistar rats which have been starved for 24 hours. The rats each are let blood via the portal vein, and the concentration of amino acids in a blood sample is measured to determine the initial increasing rate of blood amino acid concentration. The nitrogen source samples used are nitrogen sources I, II, III and IV used to prepare the above-mentioned diets and having the same amino acid constitution. The results represented in terms of an average value for five rats are shown in Tables III and IV. Table III shows the average absorption rate of each amino acid until the peak value is reached. Table IV shows the pattern of absorption of amino acids of samples I-IV in comparison with the amino acid composition of these samples administered.

TABLE III

| | I | II | III | IV |
|---|---|---|---|---|
| Met / Cys | 11.4 | 21.8 | 14.7 | 16.6 |
| Leu | 11.5 | 31.2 | 19.0 | 20.9 |
| Ile | 8.1 | 16.6 | 15.4 | 15.8 |
| Val | 8.0 | 18.7 | 13.7 | 14.6 |
| Lys | 9.9 | 23.3 | 17.6 | 19.3 |
| Phe / Tyr | 5.1 | 24.6 | 8.7 | 19.7 |
| His | 1.3 | 9.8 | 3.8 | 5.2 |
| Trp | 2.3 | 4.5 | 3.3 | 3.6 |
| Total | 57.6 | 150.5 | 96.2 | 115.7 | unit: μM/min

TABLE IV

| | X | I | II | III | IV |
|---|---|---|---|---|---|
| Met / Cys | 13.1 | 19.8 | 14.5 | 15.2 | 14.3 |
| Leu | 18.2 | 20.0 | 20.7 | 19.8 | 18.1 |
| Ile | 12.2 | 14.1 | 11.0 | 16.0 | 13.7 |

TABLE IV-continued

|     | X    | I    | II   | III  | IV   |
|-----|------|------|------|------|------|
| Val | 12.8 | 14.0 | 12.4 | 14.2 | 12.6 |
| Lys | 17.7 | 17.2 | 15.5 | 18.3 | 16.7 |
| Phe } | 17.2 | 8.9 | 16.3 | 9.0 | 17.0 |
| Tyr |      |      |      |      |      |
| His | 6.7  | 2.3  | 6.5  | 4.0  | 4.5  |
| Trp | 2.0  | 3.7  | 3.0  | 3.4  | 3.1  |

As seen from the test results shown in Tables III and IV, the low-molecular weight peptide composition used in the nutrient agent according to the present invention exerts the following effects.

(1) Peptide composition II according to the present invention is rapidly absorbed as compared with egg white protein material I, and shows reduced amino acid absorption antagonism and increased solubility as compared with amino acid mixture III. Peptide composition II is more easily absorbed than proteolytic product IV according to the prior art and is about 1.5 to 2.5 times as high as the latter in initial absorption rates of an individual amino acid and total amino acids. It is speculated that this difference in absorption rate is attributable to the amino acid absorption antagonism in the case of the amino acid mixture, the different absorption route in the case of the conventional peptide composition, and the wide molecular weight distribution and different absorption route in the case of the egg white protein material. It is evident that the low-molecular peptide composition according to the present invention exhibits an increased absorption rate because the peptides are low molecular and amino acid absorption antagonism is reduced. As a result, total nitrogen absorption is increased, food efficiency or weight gain is improved, and blood cholesterol value is reduced as mentioned above.

(2) It is desired that amino acid absorption approximates to the pattern of amino acid composition X of each material administered. Table IV apparently shows that egg white protein material I and amino acid mixture III largely deviate from the original amino acid composition, particularly with respect to Phe, Tyr and His. Peptide composition II according to the present invention shows an amino acid absorption pattern approximate to the ideal absorption pattern, providing for well-balanced absorption.

As clearly understood from the above test results, a low-molecular weight peptide composition mainly based on dipeptides and tripeptides which has a number of advantages as demonstrated above can be a highly effective nitrogen or protein source for a nutrient agent.

According to the present invention, such a low-molecular peptide composition is produced by enzymatic hydrolysis of any suitable protein raw material. Since the thus produced composition cannot contain any amino acids other than those contained in the starting material, egg white is the best starting material because of its amino acid constitution. Some starting materials result in low-molecular peptide compositions which are off balance in amino acid constitution as compared with the ideal amino acid constitution. Preferably, depending on the intended use of a low-molecular peptide composition, any desired starting material may be chosen or any desired essential amino acids may be added to the obtained peptide composition before the composition is incorporated in a nutrient agent. For example, if the obtained peptide composition is short of some essential amino acids depending on a particular starting material, such essential amino acids may be made up. If a particular amino acid is required for the treatment of a patient, this amino acid may be added to the obtained peptide composition. The amino acid constitution of the peptide composition may be controlled as desired in this manner.

It is contemplated in the present invention that the content of free amino acids should be limited to about 20% by weight or less in the low-molecular peptide composition in order to physiologically take advantage of the increased absorption rate characteristic of the peptide composition or to minimize the amino acid absorption antagonism thereof. The content of relatively high molecular peptides having a molecular weight of higher than 700 should be limited to 20% by weight or less in order to prevent the intitial absorption rate from decreasing.

The nutrient agent according to the present invention may be used in a variety of applications. It may be used as an oral nutrient agent or as an enteral nutrient agent to be directly administered into the stomach or intestine with or without any other suitable nutrient agent admixed. If the taste or flavor of the nutrient agent must be taken into account, any suitable additive may be blended for its purpose. Since the nutrient agent according to the present invention has unique absorption characterstics different from those of proteins or amino acids, it is highly effective for the nourishment of persons with reduced physical strength or constitutional power as well as babies and infants. Increased food efficiency and reduced cholesterol value suggest that the present nutrient agent is also useful for middle-aged persons. For the nourishment of a patient before and after an operation, the present nutrient agent is more useful and efficient than the conventional nutrient agents such as amino acid mixtures and solubilized protein hydrolyzates.

What we claim are:

1. A process for producing a low-molecular weight peptide composition comprising dispersing a protein raw material in water at a concentration of from 5 to 20 w/v%, adding an acid to the dispersion in an amount sufficient to adjust the pH of the dispersion to between 1 and 4, adding at least two different acid preteases to the pH adjusted dispersion simultaneously or sequentially, and permitting anzymatic proteolysis to take place for 8 to 72 hours at a temperature of from 25° to 60° C., thereby producing a low-molecular weight peptide composition containing primarily dipeptides and tripeptides while suppressing the formation of free amino acids.

2. The process according to claim 1, wherein the free amino acids are present in an amount of no more than 20% by weight and those peptides having a molecular weight of at least 700 are present in an amount of no more than 20% by weight.

3. The process according to claim 1, wherein the acid proteases are selected from the group consisting of an enzymatic preparation consisting essentially of *Aspergillo peptidase A*, Pepsin, and an acid protease obtained from the genus Rhizopus.

4. The process according to claim 2, wherein the acid proteases are selected from the group consisting of an enzymatic preparation consisting essentially of *Aspergillo peptidase A*, Pepsin, and an acid protease obtained from the genus Rhizopus.

5. The process according to claim 1, further comprising adding the acid proteases to the pH adjusted dispersion in an amount of at least 1% by weight based on the weight of the protein raw material.

6. The process according to claim 2, further comprising adding the acid proteases to the pH adjusted dispersion in an amount of at least 1% by weight based on the weight of the protein raw material.

7. The process according to claim 5, wherein the acid proteases are present in an amount of between 2 and 5% by weight based on the weight of the protein raw material.

8. The process according to claim 6, wherein the acid proteases are present in an amount of between 2 and 5% by weight based on the weight of the protein raw material.

9. The process according to claim 1, further comprising adding free amino acid to said low-molecular weight peptide composition.

10. The process according to claim 2, further comprising adding free amino acid to said low-molecular weight peptide composition.

11. A product produced by the process of claim 1.

* * * * *

UNITED STATES PATENT AND TRADEMARK OFFICE
CERTIFICATE OF CORRECTION

PATENT NO. : 4,452,888
DATED : June 5, 1984
INVENTOR(S) : Ken-ichi YAMAZAKI et al It is certified that error appears in the above-identified patent and that said Letters Patent is hereby corrected as shown below:

Column 5, line 1: "EXAMPLE V" should be repositioned in center of column as a heading; same line, "p" should be deleted.

Signed and Sealed this

Twenty-third Day of February, 1993

Attest:

STEPHEN G. KUNIN

Attesting Officer

Acting Commissioner of Patents and Trademarks